UNITED STATES PATENT OFFICE.

SHINGO KUROKI, OF TOKYO, JAPAN, ASSIGNOR TO KIMPITSU SEISHI KABUSHIKI KAISHA, LTD., OF TOKYO, JAPAN.

WRITING-PAPER AND METHOD OF MAKING THE SAME.

14,499. Specification of Reissued Letters Patent. Reissued July 30, 1918.

No Drawing. Original No. 1,234,045, dated July 17, 1917, Serial No. 144,074, filed January 23, 1917. Application for reissue filed December 7, 1917. Serial No. 206,101.

*To all whom it may concern:*

Be it known that I, SHINGO KUROKI, a subject of the Emperor of Japan, residing at Tokyo, Japan, have invented new and useful Improvements in Writing-Paper and Methods of Making the Same, of which the following is a specification.

The present invention relates to writing paper; and it comprehends, briefly, certain improvements, hereinafter fully described, in the preparation and treatment of the paper whereon the writing or marking is to be made, whereby such paper is rendered suitable for use in connection with metallic styli, the object of the invention being to obviate defects ordinarily existing in the usual methods of writing in which pens and ink or pencils are employed. The invention comprehends an improved writing paper of such character and a novel method of making it.

According to the invention, the paper to be used is subjected to successive treatments with various chemical substances, with the result that a writing surface is formed thereon, on which marks made with a metal stylus are readily and permanently legible, such marks having a sharp or clear appearance which does not change color nor fade with time, nor smudge, and being of uniform color, as opposed to the different degrees or shade or color appearing in ordinary ink or pencil writing. Also, the paper itself maintains its original whiteness or color and does not blacken with age.

In carrying out the invention, the sheets of paper to be used are first treated with a dilute solution of gum arabic, which is sprayed over either or both surfaces thereof in any desired manner and with the aid of any suitable device. Powdered white clay, which may contain a certain amount of fine, hard sand, is then scattered uniformly over the surface or surfaces of the paper; and after the surplus powder has been removed, a mixture composed of two parts, by volume, of castor oil, one part of benzene and one part of vaseline, is applied thereto by means of a roller.

Oxidized zinc in powdered form may, if desired, be mixed in equal quantities with the powdered clay, to sharpen or render more clear the marks written upon the paper; and half a part, by volume, of camphor oil may be added to the above mixture of oils for the purpose of eliminating the odor thereof.

Writing is performed in the usual way upon the paper, and at the completion of the writing operation, the letters, characters or other marks will be found to have a clear and sharp appearance, and a uniform shade or color which will not fade out with age, as previously stated; while the paper likewise tends to keep its original color.

These improved results are due primarily to the use both of the powdered white clay in place of the white paint more commonly utilized, and of the non-drying castor oil instead of the drying oil usually employed as a solvent for the paint, because of the fact that the white lead contained in the paint has the tendency to oxidize in time and thus turn the paper black, while a part of the drying oil gradually evaporates and thus lessens the smoothness of the writing surface, in consequence whereof the movement of the stylus thereover is impeded. On the other hand, the clay used according to the present invention does not become oxidized, and, hence, does not tend to blacken the paper, and the castor oil produces no such roughening or hardening of the writing surface as does the more generally used drying oil. It is important, however, to apply the powdered clay to the paper in the manner described above, before commencing with the oil treatment, for if the clay and oils were all mixed together and then applied by means of a roller or the like to the paper, the clay might form separate deposits which would impair the smoothness of the writing surface. Furthermore, it is desirable to add both the benzene or other volatile oil and the vaseline mentioned above to the non-drying oil, since the latter, if used alone, could not be satisfactorily applied as a coating for the writing surface.

While it is essential to the invention to apply the powdered clay to the paper before the latter is treated with the oil mixture, yet it is possible to incorporate the powder in the pulp during the manufacture of the paper, instead of dusting it on a finished sheet of paper coated with gum arabic or other adhesive. Indeed, the incorporation of the powder in the pulp is, in one respect at least, preferable to the first-mentioned mode of application, since paper so prepared may again be written on after writing previously made thereon has been rubbed out by means of an eraser; whereas it is practically impossible to obtain sharp, dark writing on paper which is merely coated with the powder, after having rubbed out the previous writing, due to the fact that the passage of the eraser over the writing surface necessarily has the effect of removing some of the powder.

I claim as my invention:

1. The herein described process of manufacturing writing paper for metallic styli, which consists in treating paper material with powdered clay; and thereafter coating it with a mixture composed of a non-drying oil, a volatile oil, and vaseline.

2. The herein described process of manufacturing writing paper for metallic styli, which consists in treating paper material with powdered clay; and thereafter coating it with a mixture composed of a non-drying oil, benzene and vaseline.

3. The herein described process of manufacturing writing paper for metallic styli, which consists in treating paper material with powdered clay; and thereafter coating it with a mixture composed of castor oil, a volatile oil, and vaseline.

4. The herein described process of manufacturing writing paper for metallic styli, which consists in treating paper material with powdered clay; and thereafter coating it with a mixture composed of castor oil, benzene, and vaseline.

5. The herein described process of manufacturing writing paper for metallic styli, which consists in treating paper material with powdered clay; and thereafter coating it with a mixture composed of a non-drying oil, a volatile oil, vaseline, and a deodorizing substance.

6. The herein described process of manufacturing writing paper for metallic styli, which consists in treating paper material with powdered clay; and thereafter coating it with a mixture composed of a non-drying oil, a volatile oil, vaseline, and camphor oil.

7. The herein described process of manufacturing writing paper for metallic styli, which consists in treating paper material with a mixture of powdered clay and zinc oxid; and thereafter coating it with a mixture composed of a non-drying oil, a volatile oil, and vaseline.

8. The herein described process of manufacturing writing paper for metallic styli, which consists in treating paper material with a mixture of powdered clay and zinc oxid; and thereafter coating it with a mixture composed of a non-drying oil, a volatile oil, vaseline, and a deodorizing substance.

9. The herein described process of manufacturing writing paper for metallic styli, which consists in treating paper material with a mixture of powdered clay and zinc oxid; and thereafter coating it with a mixture composed of castor oil, benzene, and vaseline.

10. The herein described process of manufacturing writing paper for metallic styli, which consists in treating paper material with a mixture of powdered clay and zinc oxid; and thereafter coating it with a mixture composed of castor oil, benzene, vaseline, and a deordorizing substance.

11. The method of making a writing paper adapted to be written upon by a soft pointed metallic stylus, which comprises treating paper material with powdered clay and then adding a non-drying unguent.

12. A writing paper having a writing surface comprising powdered clay tempered by a non-drying unguent.

13. A writing paper having a coating of powdered clay made adherent thereto by an adhesive and tempered with a non-drying unguent.

14. A writing paper having a coating of powdered clay made adherent thereto by gum arabic, and tempered with a non-drying oil.

SHINGO KUROKI.

Witnesses:
GEUJI KUIBARA,
H. BEPPU.